United States Patent [19]

Peluso

[11] 4,271,624

[45] Jun. 9, 1981

[54] PORTABLE TACKLE AND BAIT HOLDER

[76] Inventor: Nicholas Peluso, 210 Belvedere Dr., Massapequa Park, N.Y. 11762

[21] Appl. No.: 70,284

[22] Filed: Aug. 27, 1979

[51] Int. Cl.³ .................. A01K 97/04; A01K 97/06
[52] U.S. Cl. ................................. 43/54.5 R; 43/55; 17/55
[58] Field of Search .............. 17/53, 55; 43/54.5 R, 43/55, 56, 57, 57.5 R; 119/3; 206/315 R; 224/920

[56] References Cited

U.S. PATENT DOCUMENTS

| | | | |
|---|---|---|---|
| 2,560,054 | 7/1951 | Wells | 43/55 |
| 2,721,718 | 10/1955 | Wagner | 43/55 X |
| 2,765,577 | 10/1956 | Scruggs | 43/55 |
| 2,803,084 | 8/1957 | Frerking | 43/55 |
| 3,148,811 | 9/1964 | Foltz | 43/57.5 R |
| 3,201,017 | 8/1965 | Morrissey | 224/920 X |
| 3,590,423 | 7/1971 | Messer | 43/55 X |

Primary Examiner—Nicholas P. Godici
Assistant Examiner—Robert P. Olszewski
Attorney, Agent, or Firm—Allison C. Collard; Thomas M. Galgano

[57] ABSTRACT

A portable tackle and bait holder for demountable securement on the gunwale of a boat is provided which includes a generally box-shaped housing having a substantially flat, horizontally-disposed base wall having four sides, from three of which upwarding extend three upstanding sidewalls which serve as windshields. The base wall also has a multiplicity of depressions formed therein including at least one relatively deep well for chum or live bait and a plurality of relatively shallow recesses for hooks, lures and bait. The base wall also has formed therein a plurality of knife slits and water drainage holes as well as a cutting board mounted on the base wall. The housing is demountably secured to a gunwale of a boat.

8 Claims, 5 Drawing Figures

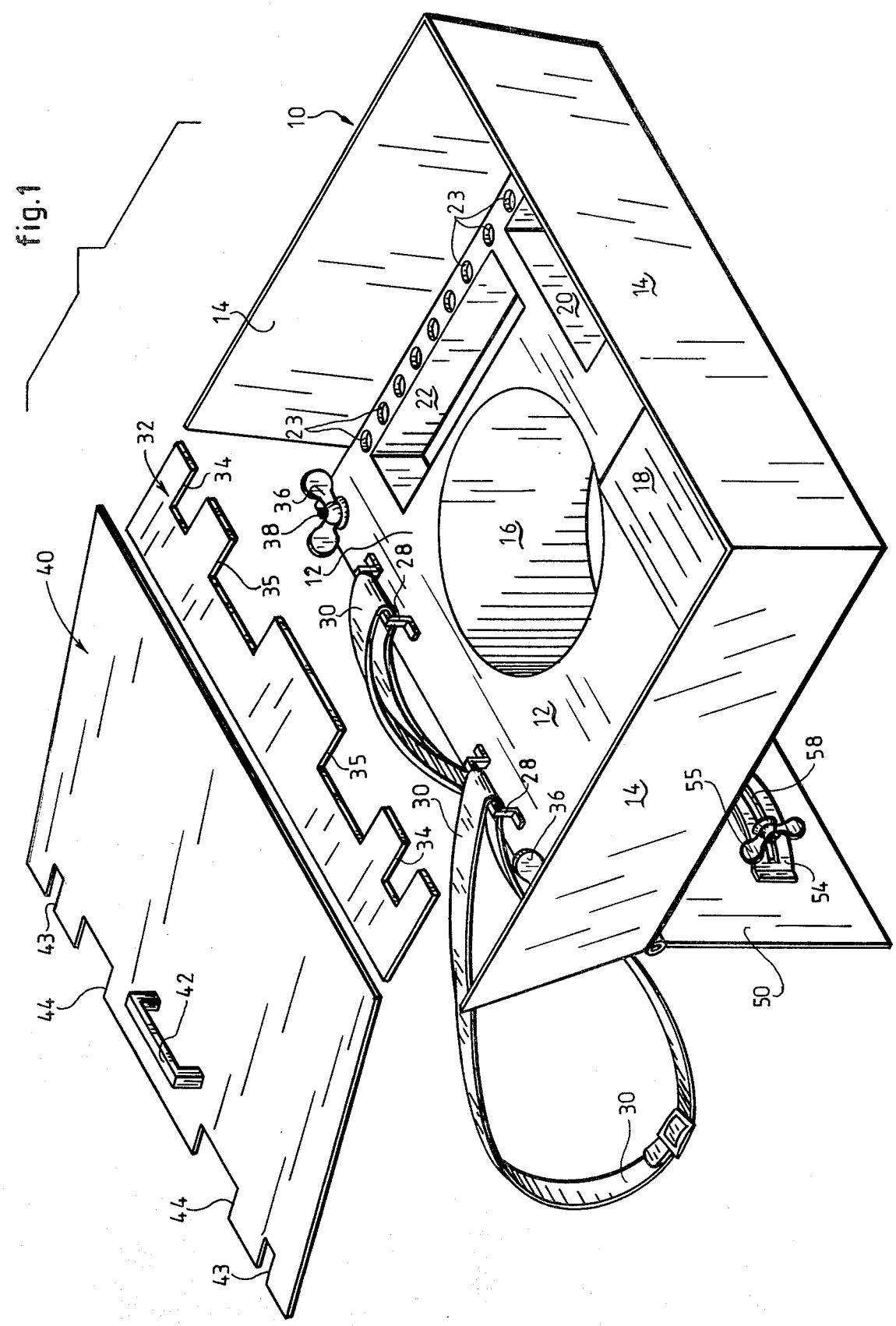

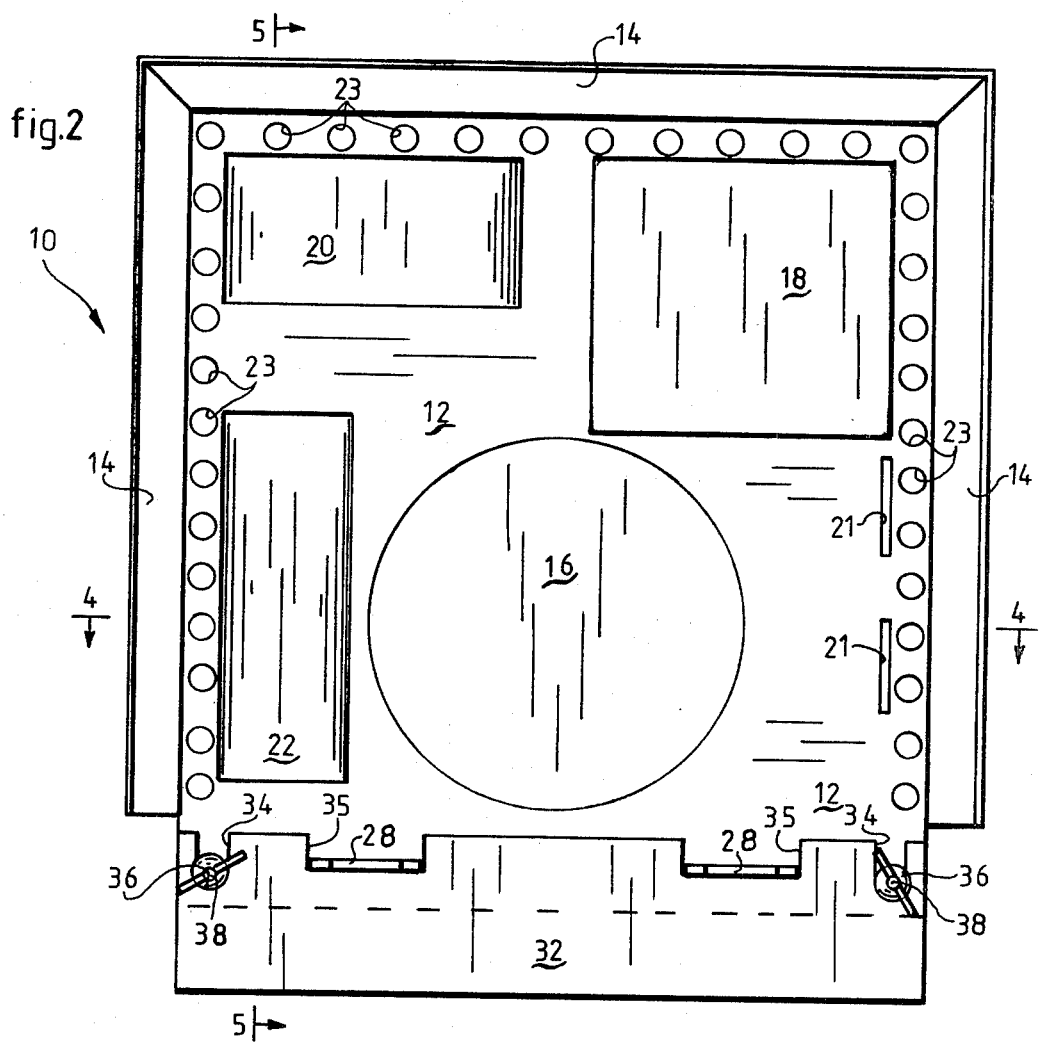
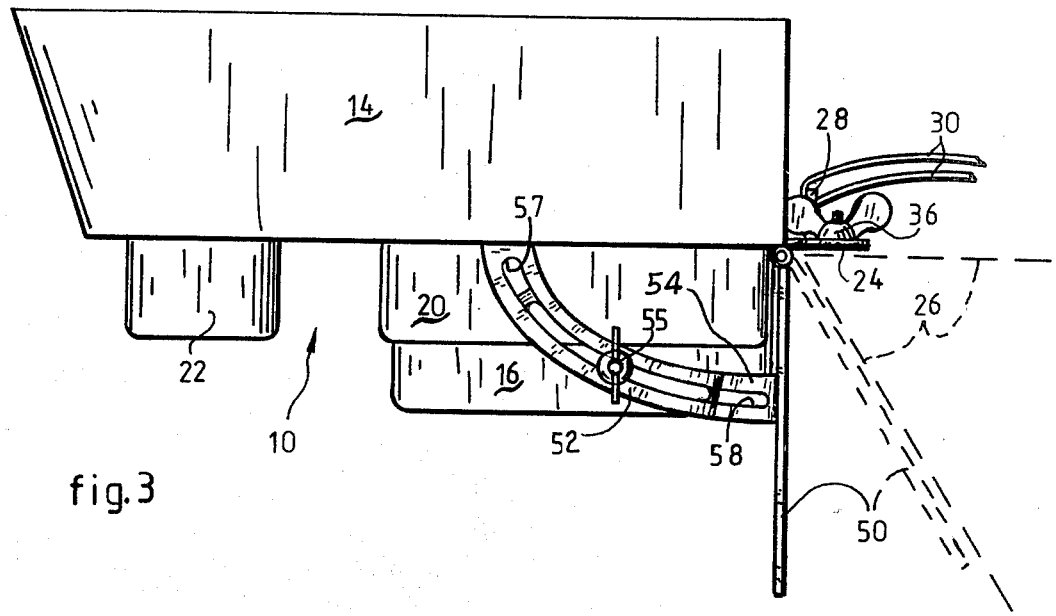

PORTABLE TACKLE AND BAIT HOLDER

The present invention relates to a tackle and bait holder. More particularly, it relates to a portable tackle and bait holder which may be demountably secured on the gunwale of a boat.

Various types of bait and tackle holders or containers have been previously proposed (see, e.g., U.S. Pat. Nos.: 2,721,718; 2,765,577; 2,800,741; 2,803,084; and 3,775,895). However, while generally satisfactory for the purposes intended, they have been found to have certain drawbacks. In particular, none appear to deal effectively in a relatively simple manner with all of the various tasks associated with fishing, i.e., bait and tackle storage, bait preparation, and fish cleaning and filleting. Furthermore, none appear to permit easy and facile mounting and dismounting, and yet afford secure and proper positioning on a gunwale of a boat.

Accordingly, it is an object of the present invention to provide a novel, portable tackle and bait holder which serves a variety of fishing tasks in a relatively simple and highly effective manner.

It is also an object of the present invention to provide such a portable tackle and bait holder which may be conveniently and easily demountably secured to a gunwale of a boat.

It is a more particular object of the present invention to provide a novel, portable tackle and bait holder having the foregoing attributes and characteristics which is relatively inexpensive to produce and simple in construction, and which is durable and reliable in use.

Certain of the foregoing and related objects are readily attained according to the present invention by the provision of a portable tackle and bait holder for demountable securement on the gunwale of a boat, which includes a generally box-shaped housing having a substantially flat, horizontally-disposed base wall having four sides, from three of which upwarding extend three upstanding sidewalls which serve as windshields. The base wall has a multiplicity of depressions formed therein including at least one relatively deep well for chum or live bait and a plurality of relatively shallow recesses for hooks, lures, and bait. The base wall also has formed therein a plurality of knife slits and water drainage holes as well as a cutting board mounted on the base wall. Means are also provided for demountably securing the housing to a gunwale of a boat.

Preferably, the holder additionally includes a cover plate positionable on and over the base wall which serves both as a protective cover and a fish cleaning and filleting board. Most advantageously, the means for demountably securing includes a flange extending outwardly from the side of the base wall not having an upstanding sidewall, which is intended to be seated upon the top of the gunwale. At least one strap cleat is secured to the housing and is received on the strap cleat and is securable to the boat.

Most desirably, the holder additionally includes leveling means secured to the housing for maintaining a relatively horizontal disposition of the base wall. In a preferred embodiment, the leveling means includes a hinge plate, hingeably secured to the side of the base wall not having a sidewall extending upwardly therefrom which is disposed for resting abutment against the outside surface of the boat gunwale and at least one pair of arcuate, slotted coacting slide members, one of which is secured to the base wall and the other of which is secured to the hinge plate such that at least a portion of the slots thereof are in alignment with one another. Bolt and nut means are provided for locking the slide members in a fixed position relative to one another so as to in turn, fix the angular position of the hinge plate relative to the base wall.

In a particularly preferred embodiment, the holder includes an adjustable slide extension plate securable to the flange for adjustably extending the effective length of the flange, nut and bolt means are preferably provided for detachably securing the slide extension to the flange. It is also desirable if the cutting board lies flush with the base wall so as to permit, in turn, a flush mounting of the cover plate on the base wall.

Other objects and features of the present invention will become apparent from the following detailed description, considered in connection with the accompanying drawings, which discloses one embodiment of the invention. It is to be understood, however, that the drawings are designed for the purpose of illustration only, and not as a definition of the limits of the invention.

In the drawings, wherein similar reference characters denote similar reference elements throughout the several views:

FIG. 1 is a top, front and side perspective view of a novel tackle and bait holder embodying the present invention;

FIG. 2 is a plan view of the main housing of the holder shown in FIG. 1, with an extension plate secured thereto;

FIG. 3 is a side view of the main housing shown in FIG. 1, showing in phantom line the relative angular orientation of its hinge plate to the side of the gunwale of a boat;

Figure 4:
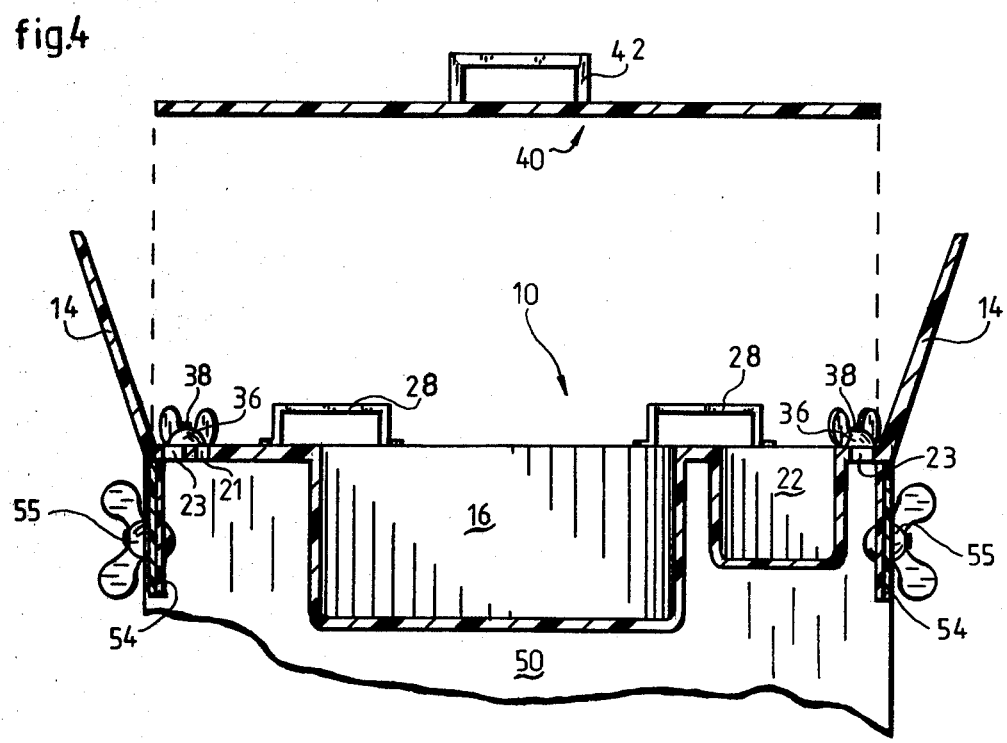
FIG. 4 is a sectional view taken along line 4—4 of FIG. 2, further showing the placing of a cover plate thereon.

Turning now in detail to the appended drawings, therein illustrated is a novel tackle and bait holder embodying the present invention which, with reference to FIGS. 1-3, includes a main housing 10. Main housing 10 consists of a generally rectangular, horizontally-disposed, flat base wall 12, and three sidewalls 14 which extend upwardly from three sides of base wall 12, the latter of which serve as windshields to protect the contents against wind and surf.

Base wall 12 has a number of depressions or recesses formed therein for accommodating fishing tackle and bait. As can be seen more clearly in FIG. 2, base wall 12 has a generally centrally-disposed deep well 16 which is intended for chum, live bait or for chopping mussels. There is also a cutting board 18 which is used for cutting bait (e.g., worms). A further recess 20 which is relatively shallow compared to deep well 16 is provided for holding various types of bait (worms, squid, etc.). A further recess 22 is provided for holding hooks and lures and other fishing tackle. In addition, base wall 12 is provided with two knife slits 21 in which knives for cutting the bait may be retained. There are also a multiplicity of drainage holes 23 disposed about the periphery of base wall 12.

Figure 5:
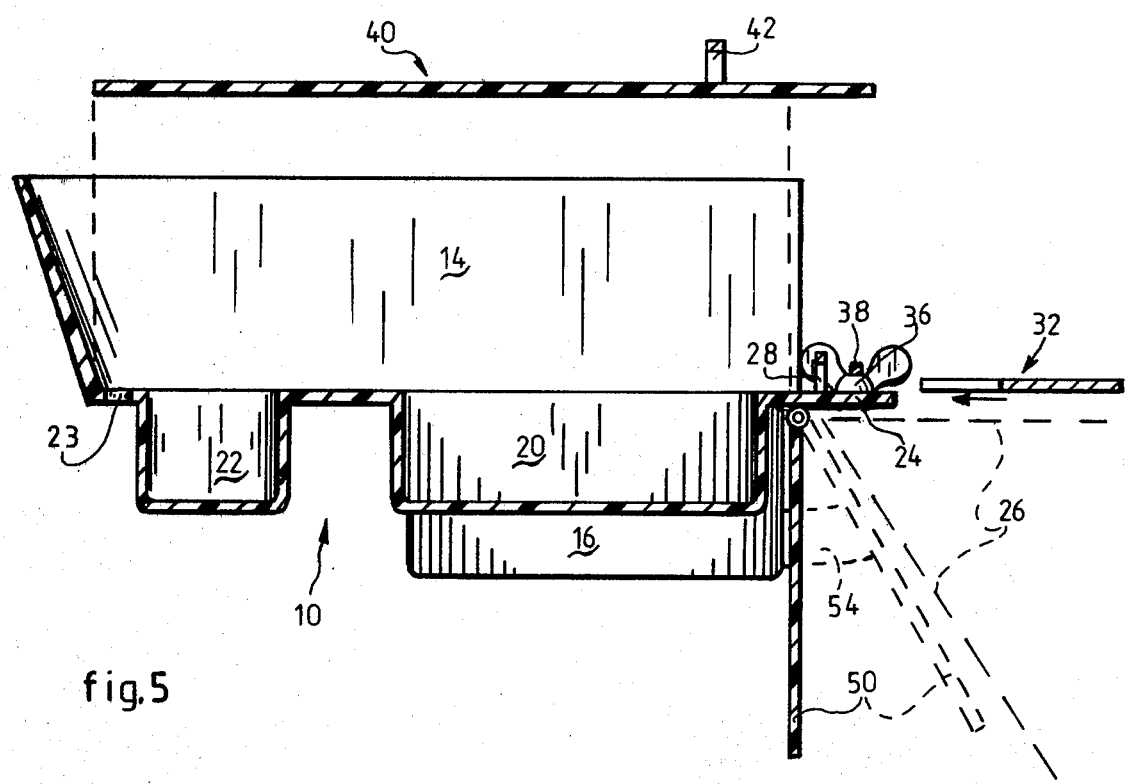
FIG. 5 is a sectional view taken along line 5—5 of FIG. 2, further showing the introduction of the extension plate, and in phantom view, the pivotal adjustment of the hinge plate to accommodate the orientation of the outside wall of a boat gunwale.

As seen best in FIGS. 3 and 5, base wall 12 is provided with a flange or lip portion 24, which is intended to rest upon the gunwale 26 of a boat. To facilitate the secure mounting of main housing 10 on the boat, base wall 12 is provided with a pair of U-shaped cleats 28 which are secured to flange 24 of base wall 12. A pair of straps 30 are provided which are intended to be received through cleats 28 and a corresponding pair of cleats which would be secured to the inside surface of the gunwale of the boat (not shown). By tightening the straps, the main housing 10 would be securely fastened to the boat. Of course, other suitable mounting means may be employed, for instance, it might be possible to employ Velcro straps for quick and easy mounting and dismounting. Alternatively, C-shaped, vise-type clamps could be used for securing the flange to the gunwale 26 of the boat.

In any event, in order to accommodate variously dimensioned boat gunwales, flange 24 is provided with an adjustable slide extension plate 32 which is provided with two outer, relatively narrow, rectangular-shaped slots 34 which are intended to be slid underneath a pair of wing nuts 36 held by bolts 38 on flange 34. Extension plate 32 is also provided with two inner, relatively wide cut-out portions 35 which are dimensioned and positioned to slip past strap cleats 28. As can be appreciated, by loosening wing nut 36, extension plate 32 may be slid outwardly or inwardly according to the dimension of the top surface of gunwale 26 and then, by tightening the wing nuts 36, the extension will be locked in its proper position.

There is also provided a cover plate 40 which has a generally rectangular outline and which is provided with a handle 42 and two narrow, outer cut-out portions 43, which serve to accommodate the wing nuts 36, and two wide cut-out portions 44 which serve to accommodate the strap cleats 28. As shown in FIGS. 4 and 5, cover plate 40 is intended to be placed directly onto base wall 12 with the cut-outs 43 and 44 preventing any obstruction from wing nuts 36 and cleats 28, respectively. This cover may be placed in position to prevent the spilling of bait and tackle during rough sea conditions or inclimate weather. In addition, it serves as a fish cleaning and filleting board.

As shown in FIGS. 1, 3, and 5, secured to the side of base wall 12 which is closest to gunwale 26 and which does not have any upstanding sidewall secured thereto, is a hinge plate 50 hingeably secured to base wall 12 to allow pivotal movement thereof to a position at which it may abut the outer surface of a gunwale 26 according to its particular angular orientation. In order to hold hinge plate 50 in place, there are provided two pairs of arcuate, slotted slide members 52, 54. Slide members 52 are secured at one end to the underside of base wall 12, adjacent to opposite lateral side edges thereof, and the other slide members 54 are each secured adjacent to opposite lateral side edges of hinge plate 50. A wing nut and bolt assembly 55 is received in the slots 57, 58 of slide members 52 and 54, respectively, to permit the extension and retraction of slide member 54 relative to slide member 52. This, in turn, permits pivotable adjustment of hinge plate 50 so that it may accommodate any angular orientation of the outer surface of the gunwale 26 of a boat.

It should be pointed out that the majority of the components of the holder may be fabricated from plastic so as to simplify construction. In particular, the main housing could be injection-molded plastic. It should also be appreciated that the size, dimensions and number of bait recesses may be varied, although the particular arrangement shown has been found to be a particularly suitable and effective arrangement.

Thus, while only a single embodiment of the present invention has been shown and described, it will be obvious that many other modifications and changes may be made thereinunto, without departing from the spirit and scope of the invention.

What is claimed is:

1. A portable tackle and bait holder for demountable securement on the gunwale of a boat, comprising:
 a generally box-shaped housing having a substantially flat, horizontally-disposed base wall having four sides, from three of which upwardly extend three upstanding sidewalls which serve as windshields, said base wall having a multiplicity of depressions formed therein including at least one relatively deep depression which serves as a well for chum or live bait and a plurality of relatively shallow depressions which serve as recesses for hooks, lures, and bait, said base wall also having formed therein a plurality of knife slits and water drainage holes as well as a cutting board mounted on said base wall; and
 means for demountably securing said housing to a gunwale of a boat.

2. The holder according to claim 1, additionally including a cover plate positionable on and over said base wall which serves both as a protective cover and a fish cleaning and filleting board.

3. The holder according to claim 1, wherein said means for demountably securing includes a flange extending outwardly from the side of said base wall not having an upstanding sidewall, which flange is intended to be seated upon the top of the gunwale, at least one strap cleat secured to said housing and at least one strap which is received through said strap cleat and is securable to the boat.

4. The holder according to claim 1, additionally including leveling means secured to said housing for maintaining a relatively horizontal disposition of said base wall.

5. The holder according to claim 4, wherein said leveling means includes a hinge plate hingeably secured to the side of the base wall not having a sidewall extending upwardly therefrom, which hinge plate is disposed for resting abutment against the outside surface of the boat gunwale and at least one pair of arcuate, slotted coacting slide members, one of which is secured to said base wall and the other of which is secured to said hinge plate such that at least a portion of the slots thereof are in registry with one another, and bolt and nut means for locking said slide members in a fixed position relative to one another.

6. The holder according to claim 4, additionally including an adjustable slide extension plate securable to said flange for adjustably extending the effective length of said flange.

7. The holder according to claim 6, additionally including nut and bolts means for detachably securing said slide extension to said flange.

8. The holder according to claim 1, wherein said cutting board lies flush with said base wall.

* * * * *